(12) United States Patent
Noguchi et al.

(10) Patent No.: US 11,329,321 B2
(45) Date of Patent: May 10, 2022

(54) LITHIUM ION SECONDARY BATTERY

(71) Applicant: NEC Corporation, Tokyo (JP)

(72) Inventors: Takehiro Noguchi, Tokyo (JP); Takuya Hasegawa, Tokyo (JP); Ikiko Shimanuki, Tokyo (JP); Daisuke Kawasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 356 days.

(21) Appl. No.: 16/617,629

(22) PCT Filed: May 23, 2018

(86) PCT No.: PCT/JP2018/019826
§ 371 (c)(1),
(2) Date: Nov. 27, 2019

(87) PCT Pub. No.: WO2018/221346
PCT Pub. Date: Dec. 6, 2018

(65) Prior Publication Data
US 2020/0091559 A1  Mar. 19, 2020

(30) Foreign Application Priority Data
May 29, 2017 (JP) .............................. JP2017-105865

(51) Int. Cl.
*H01M 10/0569* (2010.01)
*H01M 4/38* (2006.01)
(Continued)

(52) U.S. Cl.
CPC ....... *H01M 10/0569* (2013.01); *H01M 4/386* (2013.01); *H01M 4/505* (2013.01);
(Continued)

(58) Field of Classification Search
CPC ......... H01M 10/0569; H01M 10/0525; H01M 10/0568; H01M 10/0585; H01M 4/386;
(Continued)

(56) References Cited

U.S. PATENT DOCUMENTS

| 9,905,887 B2* | 2/2018 | Takahashi ........... H01M 10/052 |
| 2014/0154591 A1 | 6/2014 | Yokotsuji et al. |

(Continued)

FOREIGN PATENT DOCUMENTS

| JP | 2009-176534 A | 8/2009 |
| JP | 2014-110235 A | 6/2014 |

(Continued)

OTHER PUBLICATIONS

International Search Report of PCT/JP2018/019826 dated Aug. 7, 2018.

*Primary Examiner* — Matthew J Merkling
(74) *Attorney, Agent, or Firm* — Sughrue Mion, PLLC

(57) ABSTRACT

A lithium ion secondary battery having high energy density and being excellent in cycle characteristics is provided. The present invention relates to a lithium ion secondary battery comprising: a negative electrode active material comprising a material comprising silicon as a constituent element; and an electrolyte solution comprising: a non-aqueous solvent comprising a fluorinated ether compound, an open-chain sulfone compound, and a cyclic carbonate compound, and a supporting salt comprising $LiPF_6$, lithium bis(fluorosulfonyl)imide, and lithium bis(oxalato)borate (LiBOB); wherein the content of LiBOB in the electrolyte solution is 0.2 mass % or more.

14 Claims, 3 Drawing Sheets

(51) Int. Cl.
*H01M 4/505* (2010.01)
*H01M 4/525* (2010.01)
*H01M 10/0525* (2010.01)
*H01M 10/0568* (2010.01)
*H01M 10/0585* (2010.01)
*H01M 4/02* (2006.01)

(52) U.S. Cl.
CPC ....... *H01M 4/525* (2013.01); *H01M 10/0525* (2013.01); *H01M 10/0568* (2013.01); *H01M 10/0585* (2013.01); *H01M 2004/027* (2013.01); *H01M 2220/20* (2013.01); *H01M 2300/0034* (2013.01)

(58) Field of Classification Search
CPC . H01M 4/505; H01M 4/525; H01M 2004/027
See application file for complete search history.

(56) References Cited

U.S. PATENT DOCUMENTS

| | | | | |
|---|---|---|---|---|
| 2014/0322615 | A1* | 10/2014 | Uehara | H01M 4/505 429/327 |
| 2015/0140421 | A1 | 5/2015 | Ihara et al. | |
| 2015/0171475 | A1 | 6/2015 | Kondo et al. | |
| 2015/0303521 | A1 | 10/2015 | Sasaki et al. | |
| 2017/0170520 | A1* | 6/2017 | Takahashi | H01M 10/052 |
| 2017/0352908 | A1* | 12/2017 | Noguchi | H01M 4/42 |
| 2018/0076485 | A1* | 3/2018 | Zhang | H01M 4/625 |
| 2018/0123124 | A1* | 5/2018 | Yang | H01M 4/386 |
| 2019/0036116 | A1* | 1/2019 | Lu | H01M 4/661 |
| 2019/0181429 | A1* | 6/2019 | Ishii | H01M 4/587 |
| 2019/0229373 | A1* | 7/2019 | Kohyama | H01M 10/0568 |
| 2019/0393554 | A1* | 12/2019 | Noguchi | H01M 4/525 |

FOREIGN PATENT DOCUMENTS

| | | |
|---|---|---|
| JP | 2015-005329 A | 1/2015 |
| JP | 2015-103288 A | 6/2015 |
| JP | 2015-534254 A | 11/2015 |
| JP | 2016-519400 A | 6/2016 |
| JP | 2017-084788 A | 5/2017 |
| WO | 2014/080871 A1 | 5/2014 |
| WO | 2016/098428 A1 | 6/2016 |
| WO | 2016/175217 A1 | 11/2016 |

* cited by examiner

LITHIUM ION SECONDARY BATTERY

CROSS REFERENCE TO RELATED APPLICATIONS

This application is a National Stage of International Application No. PCT/JP2018/019826 filed May 23, 2018, claiming priority based on Japanese Patent Application No. 2017-105865 filed May 29, 2017, the disclosures of which are incorporated herein in their entirety by reference.

TECHNICAL FIELD

The present invention relates to a lithium ion secondary battery and a method of producing the same.

BACKGROUND ART

Lithium ion secondary batteries have advantages such as high energy density, low self-discharge, excellent long-term reliability and the like, and therefore they have been put into practical use in notebook-type personal computers, mobile phones and the like. Furthermore, in recent years, in addition to high functionality of electronic devices, by expansion of the market for motor-driven vehicles such as electric vehicles and hybrid vehicles, and acceleration of development of home and industrial power storage systems, development of a high performance lithium ion secondary battery which is excellent in battery characteristics such as cycle characteristics and storage characteristics and further improved in capacity and energy density has been demanded.

As a negative electrode active material for providing a high-capacity lithium ion secondary battery, metal-based active materials such as silicon, tin, alloys containing them, and metal oxides are attracting attention. However, while these electrode active materials have high capacities, the expansion and contraction of the active materials during absorbing and desorbing lithium ions is large. Due to the change in volume of the expansion and contraction, the negative electrode active material particles collapse during repeated charge and discharge, resulting in that the new active surface is exposed. This active surface has had a problem of decomposing the electrolyte solvent and deteriorating the cycle characteristics of the battery. In order to improve the battery characteristics of the lithium ion secondary battery, various studies about the composition of the electrolyte solution and the like have been made. For example, Patent Documents 1 to 3 describe an electrolyte solution comprising a specific lithium salt and an ether compound.

CITATION LIST

Patent Document

Patent Document 1: Japanese Patent Laid-Open Publication No. 2009-176534
Patent Document 2: Japanese Patent Laid-Open Publication No. 2014-110235
Patent Document 3: Japanese Patent Laid-Open Publication No. 2015-534254

SUMMARY OF INVENTION

Technical Problem

However, even when the electrolyte solutions described in Patent Documents 1 to 3 are used in a lithium ion secondary battery having a high-capacity negative electrode active material such as silicon, there has been still a problem of deterioration due to decomposition of the electrolyte solution. Therefore, an object of the present invention is to provide a lithium ion secondary battery capable of attaining good cycle characteristics, wherein the lithium ion secondary battery comprises a negative electrode comprising a silicon material that is a high-capacity negative electrode active material.

Solution to Problem

One aspect of the present example embodiment relates to the following matters.

A lithium ion secondary battery comprising:
a negative electrode active material comprising a material comprising silicon as a constituent element; and
an electrolyte solution comprising:
a non-aqueous solvent comprising a fluorinated ether compound represented by the following formula (1), an open-chain sulfone compound represented by the following formula (2), and a cyclic carbonate compound, and
a supporting salt comprising $LiPF_6$, lithium bis(fluorosulfonyl)imide (LiFSI), and lithium bis(oxalato)borate (LiBOB); wherein
the content of LiBOB in the electrolyte solution is 0.2 mass % or more;

$$R_1\text{—}O\text{—}R_2 \tag{1}$$

in formula (1), $R_1$ and $R_2$ each independently represent an alkyl group or a fluorinated alkyl group, and at least one of $R_1$ and $R_2$ represents a fluorinated alkyl group;

(2)

in formula (2), $R_1$ and $R_2$ each independently represent a substituted or unsubstituted alkyl group.

Advantageous Effect of Invention

According to the present invention, a secondary battery having high energy density and being excellent in cycle characteristics can be provided.

DESCRIPTION OF EMBODIMENTS

Figure 1:
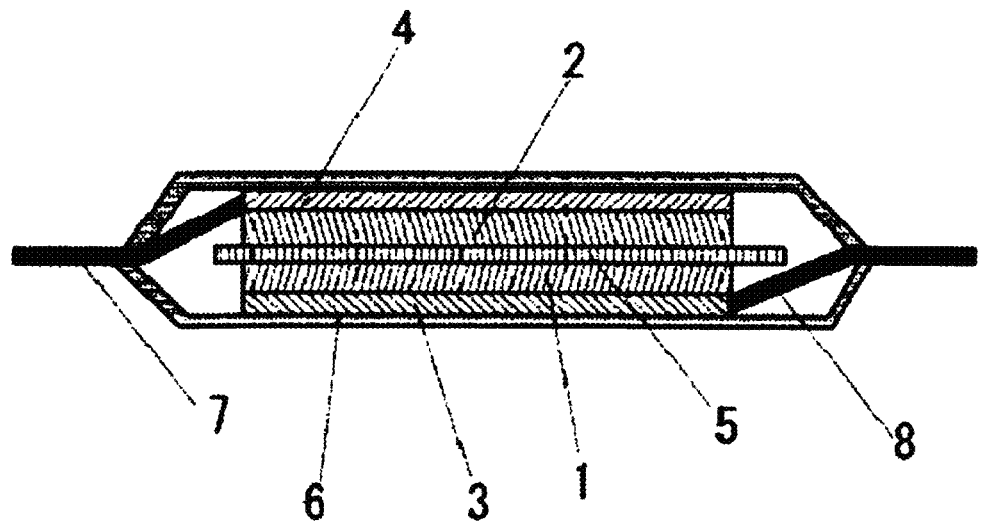
FIG. 1 is a sectional view of a lithium ion secondary battery according to one example embodiment of the present invention.

The lithium ion secondary battery of one aspect of the present example embodiment comprises:
a negative electrode active material comprising a material comprising silicon as a constituent element; and
an electrolyte solution comprising:
a non-aqueous solvent comprising a fluorinated ether compound represented by the following formula (1), an open-chain sulfone compound represented by the following formula (2), and a cyclic carbonate compound, and
a supporting salt comprising $LiPF_6$, lithium bis(fluorosulfonyl)imide (LiFSI), and lithium bis(oxalato)borate (LiBOB); wherein the content of LiBOB in the electrolyte solution is 0.2 mass % or more;

$$R_1\text{—}O\text{—}R_2 \quad (1)$$

in formula (1), $R_1$ and $R_2$ each independently represent an alkyl group or a fluorinated alkyl group, and at least one of $R_1$ and $R_2$ represents a fluorinated alkyl group;

(2)

in formula (2), $R_1$ and $R_2$ each independently represent a substituted or unsubstituted alkyl group.

Hereinafter, the lithium ion secondary battery according to the present example embodiment (simply referred to as a "secondary battery") will be described for each constituting member. In this specification, the term "cycle characteristics" means the characteristics such as capacity retention ratio after repeating the charge and discharge.

[Negative Electrode]

The negative electrode may have a structure in which a negative electrode active material layer comprising a negative electrode active material is formed on a current collector. A negative electrode of the present example embodiment comprises, for example, a negative electrode current collector formed of a metal foil, and a negative electrode active material layer formed on one side or both sides of the negative electrode current collector. The negative electrode active material layer is formed so as to cover the negative electrode collector with a negative electrode binder. The negative electrode current collector is arranged to have an extended portion connected to a negative electrode terminal, and the negative electrode active material layer is not formed on the extended portion.

(Negative Electrode Active Material)

The negative electrode active material comprises a material comprising silicon as a constituent element (hereinafter also referred to as "silicon material"). Examples of the silicon material include a metal silicon (elemental silicon), an alloy comprising silicon, and a silicon oxide represented by the formula: $SiO_x$ ($0<x\leq2$), and the silicon material preferably comprises a silicon oxide. The negative electrode active material is the material capable of absorbing and desorbing lithium. In the present specification, a substance that does not absorb and desorb lithium, such as a binder, is not included in the negative electrode active material.

The alloy comprising silicon may be an alloy of silicon and a metal other than silicon (non-silicon metal), and for example, an alloy of silicon and at least one selected from the group consisting of Li, B, Al, Ti, Fe, Pb, Sn, In, Bi, Ag, Ba, Ca, Hg, Pd, Pt, Te, Zn, La and Ni is preferable, and an alloy of silicon and at least one selected from the group consisting of Li, B, Ti, Fe and Ni is more preferable. The content of non-silicon metal in the alloy of silicon and a non-silicon metal is not particularly limited, but for example, the content thereof is preferably 0.1 to 5 mass %. Examples of the method for producing the alloy of silicon and a non-silicon metal include a method of mixing and melting elemental silicon and a non-silicon metal, and a method of coating the surface of elemental silicon with a non-silicon metal by vapor deposition or the like.

A part of or all of the surface of silicon and the silicon alloy may be coated with a silicon oxide.

The silicon material comprised in the negative electrode active material may be one kind or two or more kinds.

The content of the silicon material based on the total amount of the negative electrode active material is not particularly limited to, but is preferably 5 mass % or more, more preferably 50 mass % or more, still more preferably 70 mass % or more, and may be 100 mass %. When the content of the silicon material is within the above range, the energy density of the lithium ion secondary battery is improved and cycle characteristics can be improved. The particle size of the silicon material is, but is not particularly limited to, preferably 0.1 µm or more and 10 µm or less, and more preferably 0.2 µm or more and 8 µm or less. When the particle size is too small, reactivity with an electrolyte solution or the like becomes high, and thereby life characteristics may be deteriorated in some cases. When the particle size is too large, cracks of the particles easily occur during absorbing and desorbing Li and thereby the life may be deteriorated in some cases.

The negative electrode active material may comprise other negative electrode active material(s) in addition to the silicon material. Examples of other negative electrode active materials include carbon materials or the like.

The negative electrode active material preferably comprises carbon in addition to the silicon material. By using a silicon material together with carbon, the influence of expansion and contraction of silicon during absorbing and desorbing lithium ions can be reduced, and cycle characteristics of the battery can be improved. The silicon material and carbon may be mixed and used, and the surface of the silicon material may be coated with carbon to be used. Examples of carbon include graphite, amorphous carbon, graphene, diamond-like carbon, carbon nanotubes, and composites thereof. Here, graphite, which has high crystallinity, has high electric conductivity, excellent adhesiveness to an electrode collector formed of a metal such as copper, and excellent voltage flatness. In contrast, since amorphous carbon, which has low crystallinity, is relatively low in volume expansion, it is highly effective to reduce volume expansion of the entire negative electrode, and in addition, deterioration due to non-uniformity such as crystal grain boundary and defect hardly occurs. The content of the carbon material in the negative electrode active material is not particularly limited and may be 0 mass %, but 3 mass % or more is preferable, 5 mass % or more is more preferable, and may be 10 mass % or more, and 70 mass % or less is preferable and 60 mass % or less is more preferable.

Other negative electrode active materials that can be used in combination with the silicon material include metals other than silicon and a metal oxide. Examples of the metal include Li, Al, Ti, Pb, Sn, In, Bi, Ag, Ba, Ca, Hg, Pd, Pt, Te, Zn, La, or alloys of two or more thereof. These metals or alloys may comprise one or more non-metallic elements. Examples of the metal oxide include aluminum oxide, tin oxide, indium oxide, zinc oxide, lithium oxide, a composite thereof or the like. In addition, one or two or more element(s) selected from nitrogen, boron and sulfur may be added to the metal oxide, for example, in an amount of 0.1 to 5 mass %. This may improve the electrical conductivity of the metal oxide.

The negative electrode active material may comprise one kind or two or more kinds.

(Negative Electrode Binder)

The negative electrode binder is not particularly limited, but for example, polyacrylic acid (PAA), polyacrylic acid ester, styrene butadiene rubber (SBR), polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polystyrene, polyacrylonitrile and the like may be used. A mixture composed of a plurality of the above resins, a copolymer thereof, styrene butadiene rubber (SBR) which is a cross-linked product thereof and the like are exemplified. A thickener such as carboxymethyl cellulose (CMC) may also be used in combination. Among these, from the viewpoint of excellent binding properties, it is preferable to comprise at least one selected from the group consisting of a combination of SBR and CMC, a polyacrylic acid and a polyimide, and it is more preferable to comprise a polyacrylic acid or a polyimide.

The content of the negative electrode binder is not particularly limited, but from the viewpoint of "sufficient binding property" and "high energy production" being in a trade-off relation with each other, the content of the negative electrode binder based on the total mass of 100 mass % of the negative electrode active material is preferably 0.1 mass % or more, more preferably 0.5 mass % or more and further preferably 1 mass % or more, and it is preferably 20 mass % or less and more preferably 15 mass % or less.

Hereinafter, as one aspect of the present example embodiment, polyacrylic acid as a negative electrode binder will be described in detail, but the present invention is not limited thereto.

The polyacrylic acid comprises a (meth)acrylic acid monomer unit represented by the following formula (11). In the present specification, the term "(meth)acrylic acid" means acrylic acid and methacrylic acid.

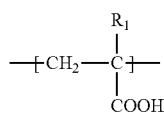

(11)

wherein in formula (11), $R_1$ is a hydrogen atom or a methyl group.

The carboxylic acid in the monomer unit represented by the formula (11) may be a carboxylic acid salt such as a metal salt of carboxylic acid. The metal is preferably a monovalent metal. Examples of the monovalent metal include alkali metals (for example, Na, Li, K, Rb, Cs, Fr and the like) and noble metals (for example, Ag, Au, Cu and the like). When the polyacrylic acid comprises a carboxylic acid salt in at least a part of the monomer units, the adhesion to the constituent material of the electrode mixture layer may be further improved.

The polyacrylic acid may comprise other monomer units. When the polyacrylic acid further comprises monomer units other than the (meth)acrylic acid monomer unit, the peel strength between the electrode mixture layer and the current collector may be improved in some cases. As other monomer units, monomer units derived from monomers including ethylenically unsaturated carboxylic acids including monocarboxylic acid compounds such as crotonic acid and pentenoic acid, dicarboxylic acid compounds such as itaconic acid and maleic acid, sulfonic acid compounds such as vinyl sulfonic acid, and phosphonic acid compounds such as vinyl phosphonic acid; aromatic olefins having acidic groups such as styrene sulfonic acid and styrene carboxylic acid; (meth) acrylic acid alkyl esters; acrylonitrile; aliphatic olefins such as ethylene, propylene and butadiene; aromatic olefins such as styrene may be exemplified. Other monomer unit(s) may be a monomer unit constituting a known polymer used as a binder for a secondary battery. In these monomer units, if present, the acid may be replaced with their salts.

Furthermore, in the polyacrylic acid, at least one hydrogen atom in the main chain and side chain may be substituted with halogen (fluorine, chlorine, bromine, iodine and the like).

When the polyacrylic acid is a copolymer comprising two or more kinds of monomer units, the copolymer may be a random copolymer, an alternating copolymer, a block copolymer, a graft copolymer and the like, or combinations thereof.

The molecular weight of the polyacrylic acid is not particularly limited, but the weight-average molecular weight is preferably 1000 or more, more preferably in the range of 10,000 to 5,000,000, and particularly preferably in the range of 300,000 to 350,000. When the weight-average molecular weight is within the above range, good dispersibility of the active material and the electrically conductive assistant agent can be maintained and excessive increase in slurry viscosity can be suppressed.

In general, an active material having a large specific surface area requires a large amount of a binder, but the polyacrylic acid has high binding ability even in a small amount. Therefore, when the polyacrylic acid is used as the negative electrode binder, the increase in resistance due to the binder is small even for the electrode comprising an active material having a large specific surface area. In addition, the binder comprising the polyacrylic acid is excellent in reducing the irreversible capacity of the battery, increasing the capacity of the battery and improving the cycle characteristics.

For the purpose of lowering the impedance, the negative electrode may additionally comprise an electrically conductive assistant agent. Examples of the additional electrically conductive assistant agent include flake-like or fibrous carbonaceous fine particles, for example, carbon black, acetylene black, ketjen black, vapor grown carbon fiber, and the like.

As the negative electrode current collector, from the viewpoint of electrochemical stability, preferred are aluminum, nickel, stainless steel, chromium, copper, silver, iron, manganese, molybdenum, titanium, niobium, and alloys thereof. Examples of its shape include foil, flat plate shape, and mesh shape.

The negative electrode may be produced according to a usual method. In one embodiment, first, the silicon material and the like as a negative electrode active material, the negative electrode binder, and the electrically conductive assistant agent and the like as an optional component are mixed with a solvent by a V type mixer (V blender), mechanical milling or the like, preferably in a stepwise manner, to prepare a slurry. Subsequently, the prepared slurry is applied to a negative electrode current collector and dried to prepare a negative electrode. Applying may be carried out by a doctor blade method, a die coater method, a CVD method, a sputtering method or the like.

[Positive Electrode]

The positive electrode may have a structure in which a positive electrode active material layer comprising a positive electrode active material is formed on a current collector. A positive electrode of the present example embodiment comprises, for example, a positive electrode current collector formed of a metal foil and a positive electrode active material layer formed on one side or both sides of the positive electrode current collector. The positive electrode active material layer is formed so as to cover the positive electrode collector with a positive electrode binder. The positive electrode current collector is arranged to have an extended portion connected to a positive electrode terminal, and the positive electrode active material layer is not formed on the extended portion.

The positive electrode active material in the present example embodiment is not particularly limited as long as the material can absorb and desorb lithium, and may be selected from several viewpoints. From the viewpoint of achieving higher energy density, a high capacity compound is preferably contained. Examples of the high capacity compound include Li-rich layered positive electrode, lithium nickelate ($LiNiO_2$), and a lithium nickel composite oxide in which a part of the Ni of lithium nickelate is replaced by another metal element, and preferred are a Li-rich layered positive electrode represented by the following formula (A1) and a layered lithium nickel composite oxide represented by the following formula (A2).

$$Li(Li_xM_{1-x-z}Mn_z)O_2 \quad (A1)$$

wherein in formula (A1), $0.1 \leq x < 0.3$, $0.4 \leq z \leq 0.8$, M is at least one of Ni, Co, Fe, Ti, Al, and Mg;

$$Li_yNi_{(1-x)}M_xO_2 \quad (A2)$$

wherein in formula (A2), $0 \leq x < 1$, $0 < y \leq 1$, M is at least one element selected from the group consisting of Li, Co, Al, Mn, Fe, Ti, and B.

From the viewpoint of high capacity, it is preferred that the content of Ni is high, that is, x is less than 0.5, further preferably 0.4 or less in the formula (A2). Examples of such compounds include $Li_\alpha Ni_\beta Co_\gamma Mn_\delta O_2$ ($0 < \alpha \leq 1.2$, preferably $1 \leq \alpha \leq 1.2$, $\alpha+\beta+\gamma+\delta=2$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\alpha+\beta+\gamma+\delta=2$, $\beta \geq 0.6$, preferably $\beta \geq 2 \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$, $\beta+\gamma+\delta=1$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A2). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\alpha+\beta+\gamma+\delta=2$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A2) may be mixed and used, and, for example, it is also preferred that NCM532 or NCM523 and NCM433 are mixed in the range of 9:1 to 1:9 (as a typical example, 2:1) and used. Further, by mixing a material in which the content of Ni in formula (A2) is high (x is 0.4 or less) and a material in which the content of Ni in formula (A2) does not exceed 0.5 (x is 0.5 or more, for example, NCM433), a battery having high capacity and high thermal stability can also be formed.

As the positive electrode active material other than the above, for example, lithium manganates having a layered structure or a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$, or materials in which a part of the transition metal in this material is substituted with other metal(s); materials having Li in an excessive amount as compared with the stoichiometric composition in these lithium transition metal oxides; and materials having an olivine structure such as $LiFePO_4$ may be exemplified. Further, materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. Such positive electrode active materials described above may be used alone, or in combination of two or more thereof.

In one aspect of the present example embodiment, a positive electrode active material having a spinel structure which operates at a potential of 4.5 V or more versus lithium is preferable, and Example thereof include a positive electrode active material represented by the following formula (B).

$$Li_a(M_xMn_{2-x-y}Y_y)(O_{4-w}Z_w) \quad (B)$$

wherein in formula (B), $0.4 \leq x \leq 1.2$, $0 \leq y$, $x+y<2$, $0 \leq a \leq 1.2$, preferably $0 < a \leq 1.2$, and $0 \leq w \leq 1$. M is a transition metal element and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one selected from the group consisting of F and Cl.

In the formula (B), M is preferably at least one selected from the group consisting of Co, Ni, Fe, Cr and Cu, and Y is preferably at least one selected from the group consisting of Li, B, Na, Al, Mg, Ti, Si, K and Ca.

Examples of a binder for positive electrode include, but are not limited to, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid and the like. Styrene-butadiene rubber (SBR) or the like may be used. When an aqueous binder such as an SBR emulsion is used, a thickener such as carboxymethyl cellulose (CMC) may also be used. The positive electrode binder may be used by mixing two or more kinds. From the viewpoint of a trade-off relationship between "sufficient binding force" and "high energy density", the amount of the binder used for positive electrode is preferably 2 to 10 parts by mass based on 100 parts by mass of the positive electrode active material.

To the coating layer comprising the positive electrode active material, an electrically conductive assistant agent may be added for the purpose of reducing the impedance. Examples of the electrically conductive assistant agent include scaly or fibrous carbonaceous fine particles, such as graphite, carbon black, acetylene black, vapor grown carbon fiber and the like.

As the positive electrode current collector, aluminum, nickel, copper, silver, iron, chromium, manganese, molybdenum, titanium, niobium, and alloys thereof are preferable from the viewpoint of electrochemical stability. The shape thereof may be foil, flat plate, or mesh. In particular, a current collector using aluminum, an aluminum alloy, or iron-nickel-chromium-molybdenum based stainless steel is preferable.

The positive electrode may be prepared by forming the positive electrode active material layer comprising the positive electrode active material and the positive electrode binder on the positive electrode current collector. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof as a positive electrode current collector is formed thereon by a method such as vapor deposition or sputtering.

[Non-Aqueous Electrolyte Solution]

The non-aqueous electrolyte solution (also simply referred to as "electrolyte solution") comprises a non-aqueous solvent and a supporting salt. In the present example embodiment, the electrolyte solution comprises a fluorinated ether compound represented by the formula (1), an open-chain sulfone compound represented by the formula (2), and a cyclic carbonate compound as a non-aqueous solvent, and $LiPF_6$, lithium bis(fluorosulfonyl)imide (LiFSI), and lithium bis(oxalato)borate (LiBOB) as a supporting salt. The content of LiBOB in the electrolyte solution is 0.2 mass % or more.

The fluorinated ether compound is represented by the following formula (1).

$$R_1-O-R_2 \quad (1)$$

in formula (1), $R_1$ and $R_2$ each independently represent an alkyl group or a fluorinated alkyl group, and at least one of $R_1$ and $R_2$ represents a fluorinated alkyl group.

The number of carbon atoms of alkyl group and fluorinated alkyl group (i.e. $R_1$ and $R_2$) in the fluorine-containing ether compound represented by the formula (1) is each independently preferably 1 or more and 10 or less, and more preferably 1 or more and 8 or less. When the numbers of carbon atoms of alkyl group and fluorinated alkyl group are each 10 or less, increase in viscosity of the electrolyte solution is suppressed and the electrolyte solution is easily immersed into the pores of the electrode and the separator, and at the same time, ion conductivity is improved and the current value in charge and discharge characteristics of the battery is improved. The alkyl group and fluorinated alkyl group ($R_1$ and $R_2$) include straight or branched open-chain.

The fluorinated ether compound represented by the formula (1) preferably has a carbon number (the total number of carbon atoms included in $R_1$ and $R_2$) of about 4 or more and 10 or less, from the viewpoint of boiling point and viscosity. 5 or more and 9 or less is more preferable.

In formula (1), as long as at least one of $R_1$ and $R_2$ is a fluorinated alkyl group, only one of them may be a fluorinated alkyl group, or both may be fluorinated alkyl groups. The fluorinated alkyl group is a group in which a part or all of hydrogen(s) of the alkyl group is (are) substituted with fluorine. By comprising fluorine, the oxidation resistance can be enhanced and cycle characteristics can be improved. When the content of fluorine atoms is large, voltage resistance can be improved and even in a high voltage battery or a battery operated at a high temperature for a long time, the decrease in capacity can be suppressed. On the other hand, when the content of fluorine (fluorine substitution ratio) is excessively large, reduction resistance may be lowered or compatibility with other solvents of the electrolyte solution may decrease in some cases. For this reason, the fluorine substitution ratio of the fluorinated ether compound contained in the non-aqueous electrolyte solution is preferably 20% or more and 100% or less, more preferably 30% or more and 95% or less, and further preferably 40% or more and 90% or less. In the present specification, the term "fluorine substitution ratio" refers to the ratio of the number of fluorine atoms based on the total number of hydrogen atoms and fluorine atoms in the fluorinated compound (fluoride compound).

Examples of the fluorinated ether compound include 2,2,3,3,3-pentafluoropropyl 1,1,2,2-tetrafluoroethyl ether, 1,1,2,2-tetrafluoroethyl 2,2,2-trifluoroethyl ether, 1H, 1H, 2'H, 3H-decafluorodipropyl ether, 1,1,2,3,3,3-hexafluoropropyl 2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H, 1H, 5H-perfluoropentyl 1,1,2,2-tetrafluoroethyl ether, 1H-perfluorobutyl 1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H, 1H, 5H-octafluoropentyl 1,1,2,2-tetrafluoroethyl ether, 1H, 1H, 2'H-perfluorodipropyl ether, heptafluoropropyl 1,2,2,2-tetrafluoroethyl ether, 1,1,2,2-tetrafluoroethyl 2,2,3,3-tetrafluoropropyl ether, 2,2,3,3,3-pentafluoropropyl 1,1,2,2-tetrafluoroethyl ether, ethyl nonafluorobutyl ether, methyl nonafluorobutyl ether, 1,1-difluoroethyl 2,2,3,3-tetrafluoropropyl ether, bis(2,2,3,3-tetrafluoropropyl) ether, 1,1-difluoroethyl 2,2,3,3,3-pentafluoropropyl ether, 1,1-difluoroethyl 1H, 1H-heptafluorobutyl ether, 2,2,3,4,4,4-hexafluorobutyl difluoromethyl ether, bis(2,2,3,3,3-pentafluoropropyl) ether, nonafluorobutyl methyl ether, bis(1H, 1H-heptafluorobutyl) ether, 1,1,2,3,3,3-hexafluoropropyl 1H, 1H-heptafluorobutyl ether, 1H, 1H-heptafluorobutyl trifluoromethyl ether, 2,2-difluoroethyl 1,1,2,2-tetrafluoroethyl ether, bis(trifluoroethyl) ether, bis(2,2-difluoroethyl) ether, bis(1,1,2-trifluoroethyl) ether, 1,1,2-trifluoroethyl 2,2,2-trifluoroethyl ether, bis(2,2,3,3-tetrafluoropropyl) ether and the like.

Among these, from the viewpoint of voltage resistance and boiling point, it is preferable to comprise at least one selected from the group consisting of 1,1,2,2-tetrafluoroethyl 2,2,3,3-tetrafluoropropyl ether, 1H, 1H, 2'H, 3H-decafluorodipropyl ether, bis(2,2,3,3,3-pentafluoropropyl) ether, 1H, 1H, 2'H-perfluorodipropyl ether, bis(2,2,3,3-tetrafluoropropyl)ether, and ethyl 1,1,2,3,3,3-hexafluoropropyl ether.

The fluorinated compound may be used alone or in combination of two or more types thereof.

The content of the fluorinated ether compound represented by the formula (1) contained in the electrolyte solution is preferably 10 mass % or more, more preferably 20 mass % or more, and further preferably 25 mass % or more, and preferably 80 mass % or less, more preferably 70 mass % or less, and further preferably 60 mass % or less in the electrolyte solution. When the content is 10 mass % or more, the effect of increasing the voltage resistance is improved. When the content is 80 vol % or less, the ion conductivity of the electrolyte solution is improved and thereby the charge and discharge rate of the battery is improved.

The fluorinated ether compound may have a low compatibility with other solvents in some cases, but by adding the open-chain sulfone compound, the compatibility between the solvents is enhanced. Even if solvents having low compatibility are once mixed uniformly, separation may occur in some cases by being left for a long period or by rise or decrease in temperature. However, the long-term stability of the electrolyte solution can be improved by mixing the fluorinated ether compound with the open-chain sulfone compound.

Among the fluorinated ether compounds, since compounds having a high fluorine substitution ratio have particularly low compatibility with other solvents, the effect of improving the uniformity of the electrolyte solution is great by mixing with the open-chain sulfone compound.

The open-chain sulfone compound is represented by the following formula (2).

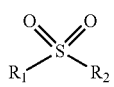

(2)

in formula (2), $R_1$ and $R_2$ each independently represent a substituted or unsubstituted alkyl group.

In formula (2), the number of carbons $n_1$ in $R_1$ and the number of carbons $n_2$ in $R_2$ are each independently preferably $1 \leq n_1 \leq 12$ and $1 \leq n_2 \leq 12$, more preferably $1 \leq n_1 \leq 6$ and $1 \leq n_2 \leq 6$, and further preferably $1 \leq n_1 \leq 3$ and $1 \leq n_2 \leq 3$. The alkyl group also includes open-chain, branched-chain, and cyclic ones.

$R_1$ and $R_2$ may have a substituent, and examples of the substituent include alkyl groups having 1 to 6 carbon atoms (for example, methyl group, ethyl group, propyl group, isopropyl group, butyl group, and isobutyl group), aryl groups having 6 to 10 carbon atoms (for example, phenyl group and naphthyl group), halogen atoms (for example, chlorine atom, bromine atom, and fluorine atom) and the like.

Examples of the open-chain sulfone include dimethyl sulfone (DMS), ethyl methyl sulfone (EMS), diethyl sulfone (DES), butyl methyl sulfone, dibutyl sulfone, methyl isopropyl sulfone (MiPS), diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone (EiPS), ethyl isobutyl sulfone, tert-butyl ethyl sulfone, propyl ethyl sulfone, isobutyl isopropyl sulfone, butyl isobutyl sulfone, isopropyl (1-methylpropyl) sulfone and the like. Among these, the electrolyte solution preferably comprises at least one selected from the group consisting of ethyl methyl sulfone, methyl isopropyl sulfone, ethyl isopropyl sulfone, diethyl sulfone, and dimethyl sulfone.

These sulfone compounds may be used alone or in combination of two or more thereof.

When the electrolyte solution comprises the open-chain sulfone compound, improvement is found in the capacity retention ratio of the secondary battery and also enhancement is found in the effect of suppressing the resistance increase that has been a problem easily occurred in the negative electrode containing the silicon material. As shown in the below-mentioned Examples, this effect is remarkable when the open-chain sulfone compound is comprised, as compared with the case where the cyclic sulfone compound is comprised alone. The cyclic sulfone has a higher viscosity than the chain sulfone, and thus when it is used as an electrolyte solution, the lithium ion conductivity is low. As a result, it is difficult to distribute lithium uniformly in the electrode during the reaction between the electrode of the lithium ion battery and Li. In a silicon-based negative electrode, if the absorbed amount of Li increases too much, silicon expands very largely, cracking of particles or the like occurs, electrical contact is lost, and thereby the battery capacity decreases. In an electrolyte solution having low ion conductivity, such a deterioration mode easily occurs. Therefore, in the lithium ion secondary battery comprising a silicon-based negative electrode active material, it is preferable to use an electrolyte solution comprising the open-chain sulfone rather than the cyclic sulfone.

The content of the open-chain sulfone compound in the electrolyte solution is preferably 15 mass % or more, more preferably 20 mass % or more, and preferably 80 mass % or less, more preferably 70 mass % or less, and further preferably 60% mass % or less. The open-chain sulfone compound has a relatively high dielectric constant, and thus it has an effect of easily dissociating the electrolyte supporting salt and increasing the electroconductivity of the electrolyte solution. In addition, it has high oxidation resistance and hardly generates gas even at high temperature operation. In the secondary battery comprising a silicon-based negative electrode, although there has been a problem that the electrolyte solution is decomposed at the interface between the negative electrode and the electrolyte solution, the open-chain sulfone compound added has an effect of forming a film that suppresses the reaction between the fluorinated ether compound and the silicon-based negative electrode. Furthermore, the open-chain sulfone compound can enhance the compatibility between the fluorinated ether compound and other solvents. On the other hand, since the sulfone compound has a high viscosity, if the concentration thereof is too high, the ion conductivity may be reduced in some cases.

It is preferable that the non-aqueous solvent of the electrolyte solution further comprises a cyclic carbonate compound. A cyclic carbonate compound is preferably a compound having a ring formed by bonding two oxygen atoms of a carbonate group (—O—C(=O)—O—) with a hydrocarbon group such as an alkylene group or an alkenylene group. The cyclic carbonate compound may comprise a fluorinated compound thereof.

Examples of the cyclic carbonate include, but are not particularly limited to, ethylene carbonate (EC), propylene carbonate (PC), butylene carbonate (BC), or vinylene carbonate (VC) and the like. Examples of the fluorinated cyclic carbonate include compounds in which a part or all of the hydrogen atoms in ethylene carbonate (EC), propylene carbonate (PC), butylene carbonate (BC), vinylene carbonate (VC) and the like is(are) substituted with fluorine atom(s). More specifically, for example, 4-fluoro-1,3-dioxolan-2-one (monofluoroethylene carbonate), (cis or trans)4,5-difluoro-1,3-dioxolan-2-one, 4,4-difluoro-1,3-dioxolan-2-one, 4-fluoro-5-methyl-1,3-dioxolan-2-one and the like may be used. Among the cyclic carbonates listed above, from the viewpoint of voltage resistance and electrical conductivity, ethylene carbonate, propylene carbonate, 4-fluoro-1,3-dioxolan-2-one and the like are preferable, and ethylene carbonate, propylene carbonate and 4-fluoro-1,3-dioxolan-2-one are more preferable. The cyclic carbonates may be used alone or in combination of two or more thereof.

Since the cyclic carbonate has a large relative dielectric constant, when the electrolyte solution comprises the cyclic carbonate, the dissolution of the supporting salt is enhanced and sufficient electrical conductivity is easily imparted. When the electrolyte solution comprises a cyclic carbonate, there is an advantage that the ion mobility in the electrolyte solution is enhanced. However, under high voltage or high temperature, the gas generation amount from the cyclic carbonate tends to be large as compared to that from the fluorinated ether and the sulfone-based material. On the other hand, the cyclic carbonate has the effect of improving life characteristics by forming the film on the negative electrode. Thus, from the viewpoint of the effect of increasing dissociation degree of the supporting salt and the effect of increasing the electrical conductivity, the content of the cyclic carbonate in the non-aqueous electrolyte solution is preferably 1 mass % or more, more preferably 2 mass % or more, and preferably 30 mass % or less, more preferably 20 mass % or less, and further preferably 10 mass % or less.

The respective preferred volume ratios of the fluorinated ether compound, the open-chain sulfone compound and the cyclic carbonate in the non-aqueous solvent are as follows.

The volume ratio of the fluorinated ether compound based on the total volume of the fluorinated ether compound, the open-chain sulfone compound and the cyclic carbonate compound is preferably 10 vol % or more, more preferably 15 vol % or more, and still more preferably 20 vol % or more, and preferably 80 vol % or less, more preferably 75 vol % or less.

The volume ratio of the open-chain sulfone compound based on the total volume of the fluorinated ether compound, the open-chain sulfone compound and the cyclic carbonate compound is preferably 20 vol % or more, more preferably 25 vol % or more, and preferably 90 vol % or less, more preferably 85 vol % or less, and still more preferably 80 vol % or less.

The volume ratio of the cyclic carbonate compound based on the total volume of the fluorinated ether compound, the open-chain sulfone compound and the cyclic carbonate compound is preferably 1 vol % or more, more preferably 2 vol % or more, and preferably 35 vol % or less, more preferably 25 vol % or less, still more preferably 15 vol % or less.

Figure 6:
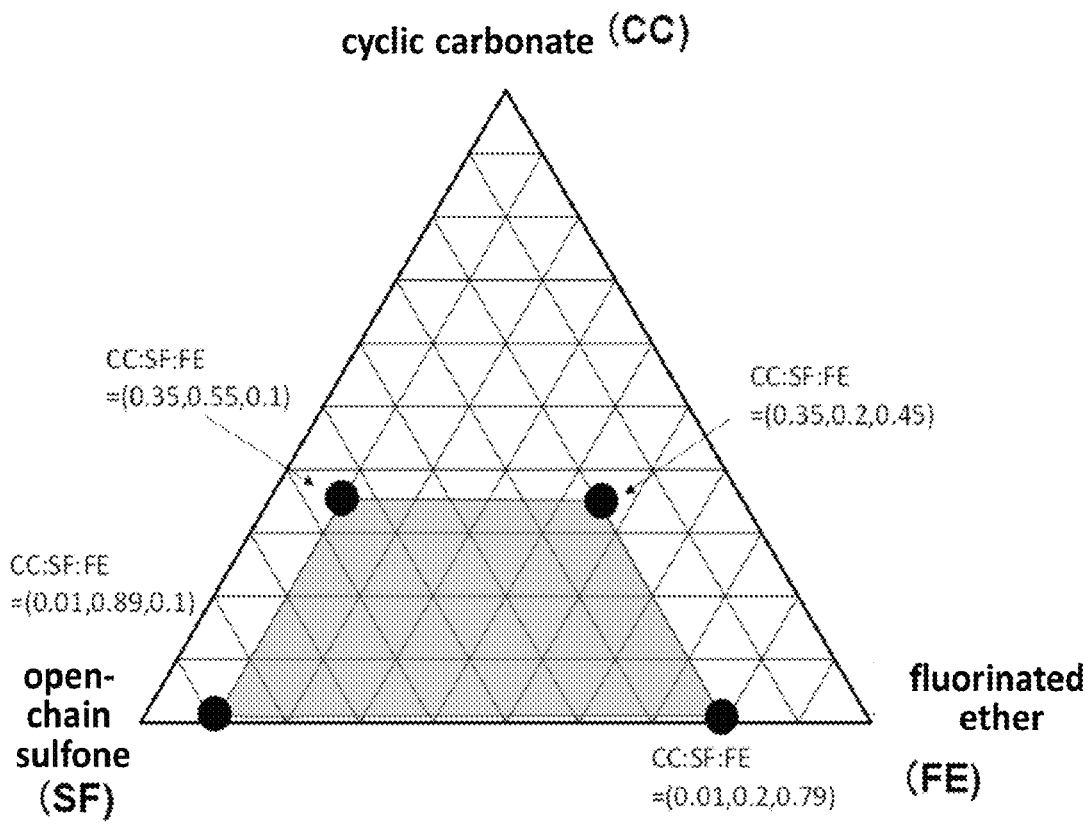
FIG. 6 is a three-phase diagram showing one aspect of the preferable area of the mixing ratio (volume ratio) of the cyclic carbonate compound, the open-chain sulfone compound and the fluorinated ether compound in the electrolyte solution used for the present example embodiment.

FIG. 6 is a three-phase diagram showing one example embodiment of a preferable mixing ratio (volume ratio) of the cyclic carbonate compound, the open-chain sulfone compound and the fluorinated ether compound in the non-aqueous solvent. It is preferred that the mixing ratio (volume ratio) of the cyclic carbonate compound (CC): the open-chain sulfone compound (SF): the fluorinated ether compound (FE) is within a range surrounded by four points of 0.01:0.89:0.1, 0.35:0.55:0.1, 0.35:0.2:0.45 and 0.01:0.2:0.79 (i.e. the range shown in gray in FIG. 6).

The electrolyte solution may further comprise other solvent(s). Examples of other solvents include, but are not limited to, cyclic sulfone compounds, open-chain carbonate compounds (including fluorinated compounds), open-chain carboxylic acid esters (including fluorinated compounds), cyclic carboxylic acid esters (including fluorinated compounds), cyclic ethers (including fluorinated compounds), phosphoric acid esters (including fluorinated compounds) and the like.

Examples of the cyclic sulfone compounds include sulfolane (tetramethylene sulfone), methylsulfolane such as 3-methylsulfolane, 3,4-dimethylsulfolane, 2,4-dimethylsulfolane, trimethylene sulfone (thietane 1,1-dioxide), 1-methyl trimethylene sulfone, pentamethylene sulfone, hexamethylene sulfone, ethylene sulfone and the like. Among these, sulfolane and methylsulfolane are preferable.

In the present example embodiment, if the content of the cyclic sulfone compound is too large, the capacity retention ratio of the secondary battery may be reduced in some cases, and the content in the electrolyte solution is preferably 30 mass % or less, more preferably 10 mass % or less, still more preferably 5 mass % or less, and may be 0 mass %.

Examples of the open-chain carbonate include, but are not particularly limited to, dimethyl carbonate (DMC), ethylmethyl carbonate (EMC), diethyl carbonate (DEC), dipropyl carbonate (DPC) and the like. The open-chain carbonate also includes a fluorinated open-chain carbonate. Examples of the fluorinated open-chain carbonate include compounds in which a part or all of hydrogen atoms in ethylmethyl carbonate (EMC), dimethyl carbonate (DMC), diethyl carbonate (DEC), dipropyl carbonate (DPC) and the like is (are) substituted with fluorine atom(s). As the open-chain fluorinated carbonate, more specifically, bis(fluoroethyl) carbonate, 3-fluoropropyl methyl carbonate, 3,3,3-trifluoropropyl methyl carbonate and the like may be exemplified. Among these, dimethyl carbonate is preferred from the viewpoint of voltage resistance and electrical conductivity. The open-chain carbonates may be used singly or in combination of two or more thereof.

The open-chain carbonate has the effect of reducing the viscosity of the electrolyte solution, and thus, it can increase electrical conductivity of the electrolyte solution.

Examples of the open-chain carboxylic acid ester include, but are not limited to, ethyl acetate, methyl propionate, ethyl formate, ethyl propionate, methyl butyrate, ethyl butyrate, methyl acetate, and methyl formate. The carboxylic acid ester also includes a fluorinated carboxylic acid ester, and examples of the fluorinated carboxylic acid ester include compounds in which a part or all of hydrogen atoms of ethyl acetate, methyl propionate, ethyl formate, ethyl propionate, methyl butyrate, ethyl butyrate, methyl acetate, or methyl formate is (are) substituted with fluorine atom(s). Examples of the fluorinated carboxylic acid ester include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, and ethyl trifluoroacetate. Among these, from the viewpoint of voltage resistance, boiling point and the like, ethyl propionate, methyl acetate, methyl 2,2,3,3-tetrafluoropropionate, 2,2,3,3-tetrafluoropropyl trifluoroacetate and the like are preferable. The open-chain carboxylic acid ester is effective in reducing the viscosity of the electrolyte solution as well as the open-chain carbonate and the open-chain ether.

Preferable examples of the cyclic carboxylic acid ester include, but not particularly limited to, γ-lactones such as γ-butyrolactone, α methyl-γ-butyrolactone and 3-methyl-γ-butyrolactone, β-propiolactone, δ-valerolactone, and the like. The fluoride compounds of these may be used.

Preferable examples of the cyclic ethers include, but not particularly limited to, tetrahydrofuran, 2-methyltetrahydrofuran, 1,3-dioxolane, 2-methyl-1,3-dioxolane and the like. 2,2-bis(trifluoromethyl)-1,3-dioxolane, 2-(trifluoroethyl)dioxolane and the like which are partially fluorinated may be used.

Examples of the phosphoric acid ester include trimethyl phosphate, triethyl phosphate, tributyl phosphate and the like.

The phosphoric acid ester may be a fluorinated phosphoric acid ester, and for example, a compound represented by the following formula (3) is preferable.

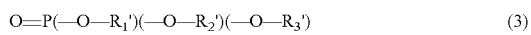
(3)

wherein in formula (3), $R_1'$, $R_2'$ and $R_3'$ each independently represent an alkyl group or a fluorinated alkyl group, and at least one of $R_1'$, $R_2'$ and $R_3'$ is a fluorinated alkyl group.

In formula (3), the number of carbon atoms in the $R_1'$, $R_2'$ and $R_3'$ is each independently preferably 1 to 4.

In the present example embodiment, the total number of carbon atoms in the fluorinated phosphoric acid ester compound (the total number of carbon atoms in $R_1'$, $R_2'$ and $R_3'$) is preferably 4 or more and 15 or less, more preferably 4 or more and 10 or less, and further preferably 5 or more and 9 or less.

Examples of the fluorinated phosphoric acid ester compound include 2,2,2-trifluoroethyl dimethyl phosphate, bis(trifluoroethyl)methyl phosphate, bistrifluoroethyl ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris(2,2,2-trifluoroethyl) phosphate (hereinafter abbreviated as PTTFE), tris(1H, 1H-heptafluorobutyl) phosphate, tris(1H, 1H, 5H-octafluoropentyl) phosphate and the like.

Among these, since the effect of suppressing decomposition of the electrolyte solution at high potential is great, the electrolyte solution preferably comprises at least one selected from tris(2,2,2-trifluoroethyl) phosphate (PTTFE), tris(2,2,3,3,3-pentafluoropropyl) phosphate and tris(1H, 1H-heptafluorobutyl) phosphate, and more preferably comprises tris(2,2,2-trifluoroethyl) phosphate.
(Supporting Salt)

In the present example embodiment, the electrolyte solution preferably comprises lithium bis(oxalato)borate (LiBOB), $LiPF_6$, and lithium bis(fluorosulfonyl)imide (LiFSI) as the supporting salts.

Lithium bis(oxalato)borate (LiBOB) is a compound represented by the following formula (4).

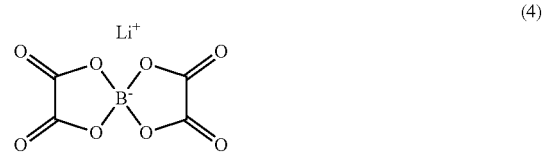 [SMILES: [Li+] ; O=C1O[B-]2(OC1=O)OC(=O)C(=O)O2]
(4)

The content of LiBOB in the electrolyte solution is preferably 0.2 mass % or more, more preferably 0.3 mass % or more, still more preferably 0.5 mass % or more, and preferably 20 mass % or less, more preferably 10 mass % or less, and still more preferably 5 mass % or less. When the content is 0.2 mass % or more, the capacity retention ratio of the secondary battery having a negative electrode comprising a silicon material can be improved, and a resistance increase in the secondary battery can be suppressed.

When the electrolyte solution comprises $LiPF_6$ and LiFSI in addition to LiBOB as the supporting salts, the solubility of the supporting salts in the electrolyte solution is increased, the gas generation amount can be suppressed, and the improvement in the life characteristics is much greater than the case where the electrolyte solution comprises each supporting salt singly.

The content of $LiPF_6$ in the electrolyte solution is preferably 0.1 mass % or more, more preferably 0.2 mass % or more, still more preferably 0.5 mass % or more, and preferably 12 mass % or less, more preferably 10 mass % or less, still more preferably 8 mass % or less. When the content of $LiPF_6$ is within the above range, it is easy to suppress corrosion of the surface of the silicon material of the negative electrode active material or the like, and also it is easy to achieve a good capacity retention ratio of the secondary battery.

The content of LiFSI in the electrolyte solution is preferably 0.2 mass % or more, more preferably 0.5 mass % or more, still more preferably 1 mass % or more, and preferably 20 mass % or less, more preferably 15 mass % or less, still more preferably 10 mass % or less.

Figure 5:
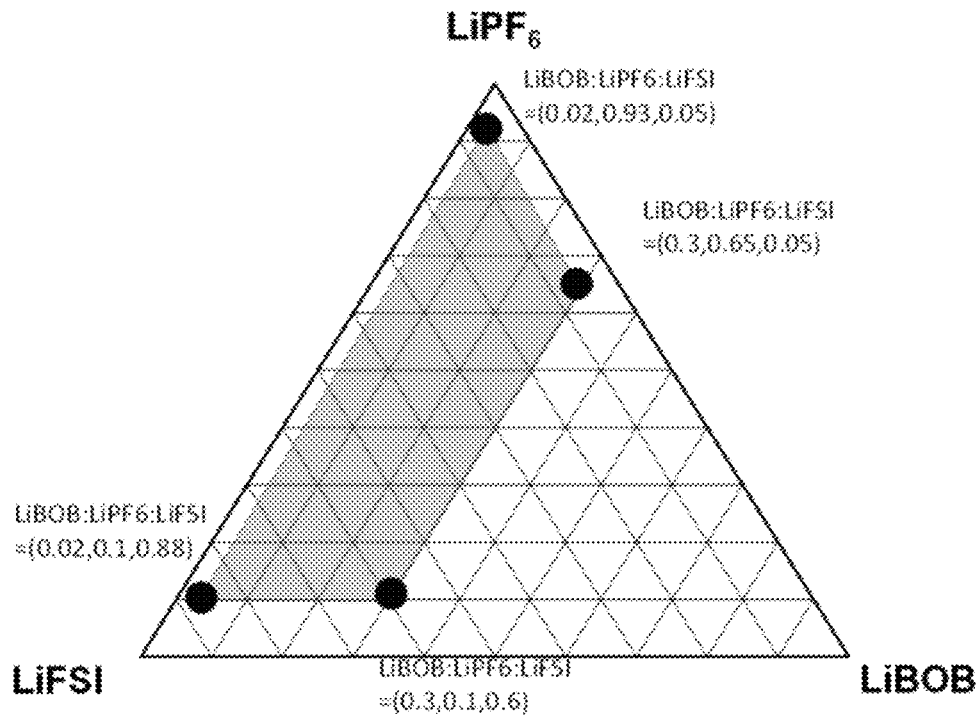
FIG. 5 is a three-phase diagram showing one aspect of the preferable area of the mixing ratio (molar ratio) of $LiPF_6$, LiFSI and LiBOB in the electrolyte solution used for the present example embodiment.

When the electrolyte solution comprises LiBOB, $LiPF_6$, and LiFSI as the supporting salts, the mixing ratio thereof is not particularly limited, and FIG. 5 is a three-phase diagram showing one example embodiment of a preferable mixing ratio (molar ratio). The preferable molar ratio of LiBOB:$LiPF_6$:LiFSI is within a range surrounded by four points of 0.02:0.93:0.05, 0.3:0.65:0.05, 0.02:0.1:0.88, 0.3:0.1:0.6 (i.e. the range shown in gray in FIG. 5).

The content of the supporting salt (the total content in case where plural types thereof are comprised) in the electrolyte solution is preferably 0.4 mol/L or more, more preferably 0.5 mol/L or more, and preferably 1.5 mol/L or less, more preferably 1.2 mol/L or less.

$LiPF_6$ is widely used as a supporting salt in the non-aqueous electrolyte solution. However, when the negative electrode comprises a silicon material as a negative electrode active material, there has been a problem that the life characteristics are largely deteriorated when $LiPF_6$ is used alone as the supporting salt. The present inventors have conducted a detailed study on this problem. When the negative electrode comprises a silicon material as a negative electrode active material, $LiPF_6$ reacts with moisture contained in the non-aqueous electrolyte solution to generate HF (hydrogen fluoride), and it is presumed that corrosion of the surface of the silicon material and deposition on the surface of the negative electrode active material are occurred. As a result, it is presumed that a part of the silicon material is deactivated and the reactivity with Li in the remaining part of the silicon material becomes too high and thus the silicon material expands, and thereby electrical contact is lost and the life characteristics are deteriorated. Therefore, the present inventors have made extensive studies to solve this problem and found that if a part of $LiPF_6$ is replaced with LiFSI and LiBOB in the non-aqueous electrolyte solution, and if a non-aqueous solvent comprises the fluorinated ether compound, the open-chain sulfone compound and the cyclic carbonate compound, the reaction on the surface of the silicon material can be suppressed and the life characteristics of the secondary battery can be improved.

The electrolyte solution may comprise other supporting salt(s) than those described above. Examples of other supporting salts include, but are not limited to, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiN(CF_3SO_2)_2$, $LiN(C_2F_5SO_2)_2$, and $LiB_{10}Cl_{10}$, lithium lower aliphatic carboxylates, chloroborane lithium, lithium tetraphenylborate, LiBr, LiI, LiSCN, LiCl, lithium difluoro(oxalato)borane and the like.

(Additive)

In the present example embodiment, the non-aqueous electrolyte solution may comprise an additive.

Examples of the additive include unsaturated carboxylic acid anhydrides, fluorinated carboxylic acid anhydrides, and cyclic or open-chain disulfonic acid esters. By adding the compound(s), the cycle characteristics of the battery may be further improved. This is presumably because these additives are decomposed during charge and discharge of the lithium ion secondary battery to form a film on the surface of the electrode active material and suppress decomposition of the electrolyte solution and the supporting salt.

[Separator]

The separator may be of any type as long as it suppresses electric conduction between the positive electrode and the negative electrode, does not inhibit the permeation of charged substances, and has durability against the electrolyte solution. Specific examples of the materials include polyolefins such as polypropylene and polyethylene; cellulose, polyethylene terephthalate, polyimide, polyvinylidene fluoride; and aromatic polyamides (aramid) such as polymetaphenylene isophthalamide, polyparaphenylene terephthalamide and copolyparaphenylene-3,4'-oxydiphenylene terephthalamide; and the like.

These may be used as a porous film, a woven fabric, a nonwoven fabric and the like.

[Insulation Layer]

An insulation layer may be formed on at least one surface of the positive electrode, the negative electrode and the separator. Examples of a method for forming the insulation layer include a doctor blade method, a dip coating method, a die coater method, a CVD method, a sputtering method and the like. The insulation layer may be formed at the same time as forming the positive electrode, the negative electrode, or the separator. Examples of materials constituting the insulation layer include a mixture of aluminum oxide, barium titanate or the like and SBR or PVDF.

[Structure of Lithium Ion Secondary Battery]

Figure 2:
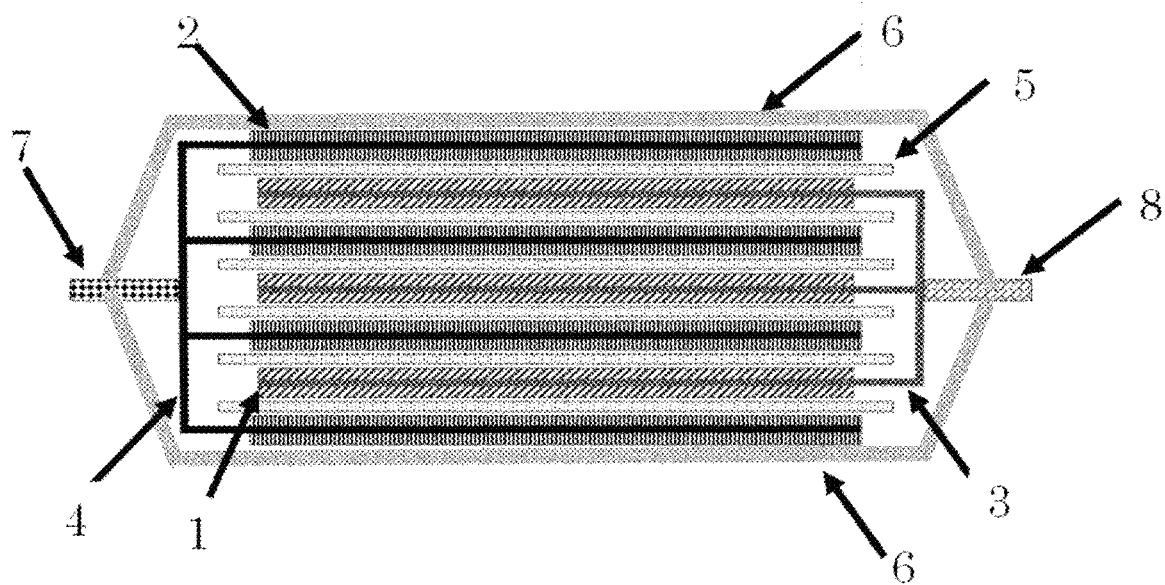
FIG. 2 is a schematic sectional view showing a structure of a stacking laminate type secondary battery according to one example embodiment of the present invention.

FIG. 1 shows a laminate-type secondary battery as an example of a secondary battery according to the present example embodiment. The separator 5 is sandwiched between a positive electrode comprising a positive electrode active material layer 1 containing a positive electrode active material and a positive electrode current collector 3 and a negative electrode comprising a negative electrode active material layer 2 and a negative electrode current collector 4. The positive electrode current collector 3 is connected to the positive electrode lead terminal 8 and the negative electrode current collector 4 is connected to the negative electrode lead terminal 7. The exterior laminate 6 is used for the outer package, and the interior of the secondary battery is filled with an electrolyte solution. The electrode element (also referred to as "battery element" or "electrode laminate") preferably has a structure in which a plurality of positive electrodes and a plurality of negative electrodes are stacked via separators, as shown in FIG. 2.

Examples of the laminate resin film used in a laminate type include aluminum, aluminum alloy, titanium foil and the like. Examples of the material of the thermally bondable portion of the metal laminate resin film include thermoplastic polymer materials, such as polyethylene, polypropylene, and polyethylene terephthalate. In addition, each of the numbers of the metal laminate resin layers and the metal foil layers is not limited to one and may be two or more.

Figure 3:
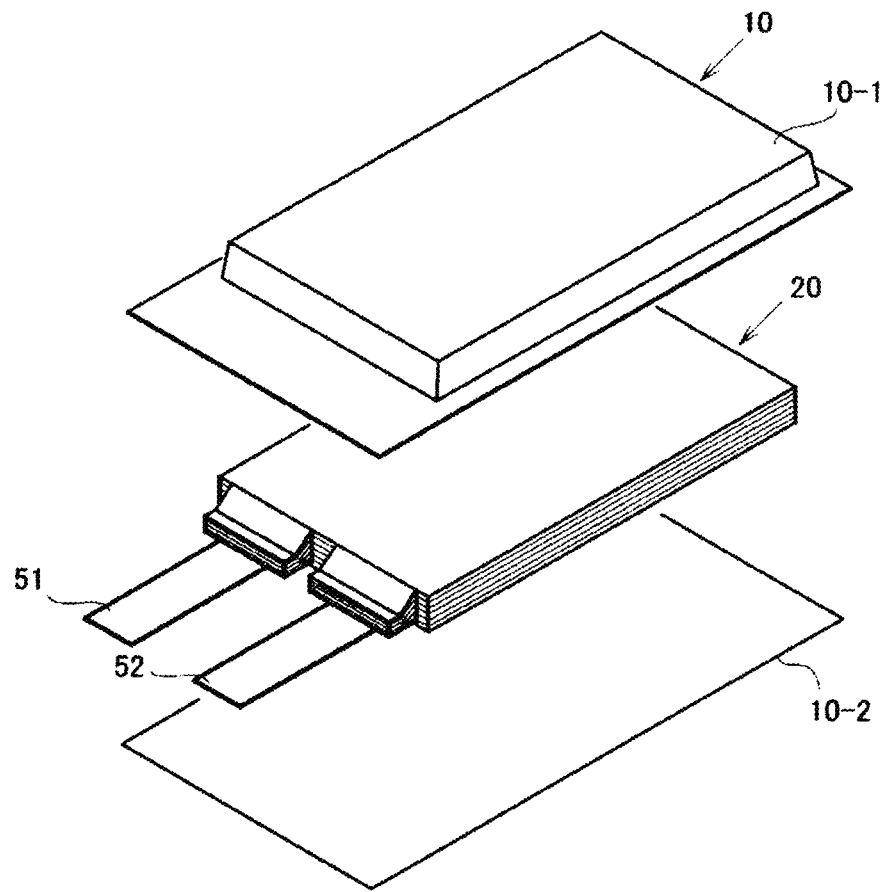
FIG. 3 is an exploded perspective view showing a basic structure of a film-packaged battery.
Figure 4:
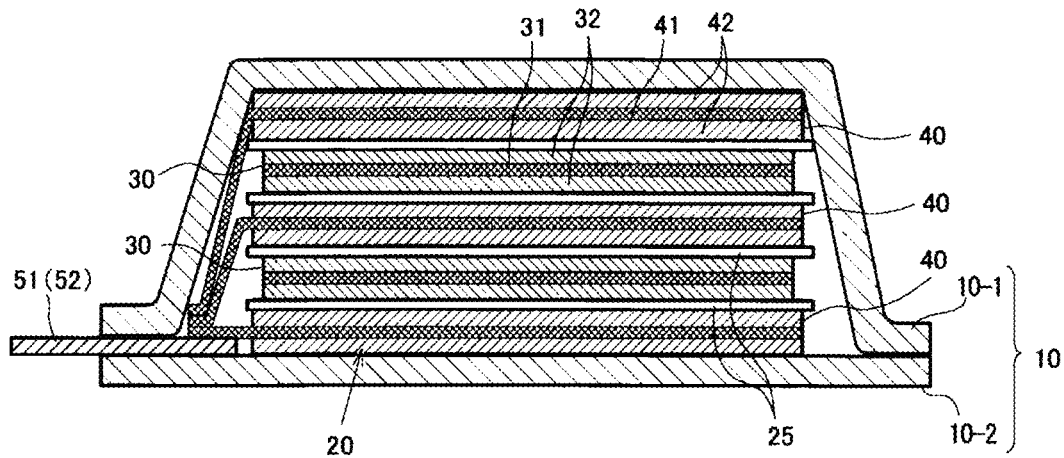
FIG. 4 is a sectional view schematically showing a section of the battery in FIG. 3.

As another embodiment, a secondary battery having a structure as shown in FIG. 3 and FIG. 4 may be provided. This secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the outer package, but a secondary battery to which the present invention may be applied may have an arrangement in which the electrode tabs are drawn out on one side of the outer package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

[Method for Manufacturing Lithium Ion Secondary Battery]

The lithium ion secondary battery according to the present example embodiment can be manufactured according to a conventional method.

An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

[Assembled Battery]

A plurality of lithium ion secondary batteries according to the present example embodiment may be combined to form an assembled battery. The assembled battery may be configured by connecting two or more lithium ion secondary batteries according to the present example embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

[Vehicle]

The lithium ion secondary battery or the assembled battery according to the present example embodiment can be used in vehicles. Examples of the vehicle according to the present example embodiment include hybrid vehicles, fuel cell vehicles, electric vehicles (besides four-wheel vehicles (cars, trucks, commercial vehicles such as buses, light automobiles, etc.), two-wheeled vehicle (bike) and tricycle), and the like. The vehicles according to the present example embodiment is not limited to automobiles, it may be a variety of power source of other vehicles, such as a moving body like a train.

EXAMPLES

Hereinafter, the present invention will be explained in details by using examples, but the present invention is not limited to these examples.

Abbreviations used in the following Examples will be described.

(Fluorinated Ether Compound)

FE1: 1,1,2,2-tetrafluoroethyl-2,2,3,3-tetrafluoropropyl ether

FE2: 1H, 1H, 2′H, 3H-decafluorodipropyl ether (Open-Chain Sulfone Compound)

DMS: dimethyl sulfone
EMS: ethyl methyl sulfone
EiPS: ethyl isopropyl sulfone
MiPS: methyl isopropyl sulfone
DES: diethyl sulfone (Cyclic Sulfone Compound)

SL: sulfolane (Cyclic Carbonate Compound)

EC: ethylene carbonate
FEC: fluoroethylene carbonate (4-fluoro-1,3-dioxolan-2-one)
PC: propylene carbonate (Open-Chain Carbonate)

DEC: diethyl carbonate (Supporting Salt)

LiBOB: lithium bis(oxalato)borate
LiFSI: $LiN(FSO_2)_2$

Example A (Production of Positive Electrode)

$Li(Li_{0.15}Ni_{0.5}Co_{0.1}Mn_{0.6})O_2$ (95 mass %) as a positive electrode active material, PVDF (2 mass %) as a positive electrode binder, and carbon black (3 mass %) as an electrically conductive agent were mixed to obtain a positive electrode mixture. The positive electrode mixture was dispersed in N-methyl-2-pyrrolidone to prepare a positive electrode slurry. This positive electrode slurry was uniformly applied to one surface of an aluminum current collector having a thickness of 20 μm. The thickness of the coating film was adjusted so that the initial charge capacity per unit area was 4.5 mAh/cm$^2$. The coated current collector was dried and then compression-shaped by a roll press to produce a positive electrode.

(Production of Negative Electrode)

SiO was used as a negative electrode active material. The SiO used was a particle in which Si and $SiO_2$ were combined, and the surface of the particle was coated with carbon (mass ratio: silicon oxide/carbon=95/5). The negative electrode active material (83 mass %), a polyimide (15 mass %) as a negative electrode binder, and carbon black (2 mass %) as an electrically conductive material are dissolved and dispersed in N-methylpyrrolidone to prepare a negative electrode slurry. This negative electrode slurry was uniformly applied on a Cu current collector having a thickness of 10 μm. The thickness of the coating film was adjusted so that the initial charge capacity per unit area was 5.0 mAh/cm$^2$. Thereafter, heat treatment at 300° C. was performed.

The positive electrode and the negative electrode cut into 3 cm×3 cm were disposed so as to be opposed to each other via a separator. For the separator, a 25 μm thickness of microporous polypropylene film was used.

The electrolyte solution was prepared by mixing a solvent and a supporting salt. The compositions of the solvent and the supporting salt are as shown in Table 1.

The above positive electrode, negative electrode, separator, and electrolyte solution were disposed in a laminate outer package, and the laminate was sealed to produce a lithium ion secondary battery. The positive electrode and the negative electrode were put into a state in which tabs were connected and electrically connected from the outside of the laminate.

<Evaluation of Lithium Ion Secondary Battery>

The lithium ion secondary batteries respectively produced in Examples and Comparative Examples were evaluated by measuring the capacity retention ratios and the reductions of average discharge voltages during 1 C discharge with the following methods.

(Capacity Retention Ratio)

The prepared battery was charged at 25 mA, and after the upper limit voltage reached 4.5 V, the battery was charged at constant voltage until the total charge time reached 2.5 hours. Then, the battery was discharged at constant current of 25 mA to a lower limit voltage of 1.5 V. This charge and discharge was repeated 300 times. The cell was disposed in a thermostat chamber at 45° C., and the charge and discharge was carried out. The ratio of a capacity at the 300th cycle to a capacity at the 1st cycle was evaluated as a capacity retention ratio after 300 cycles at 45° C. The results are shown in Table 1.

(Measurement of Reduction in Average Discharge Voltage During 1 C Discharge)

The difference (voltage drop) between the voltage measured when no current flows and the voltage when the discharge current flows can be estimated by calculation of a current value × cell resistance value. As the cell resistance increases, the reduction in the average discharge voltage during 1 C discharge becomes larger. Thus, it is possible to estimate an increase in cell resistance based on the changes of the numerical value. "Reduction in average discharge voltage during 1 C discharge" described in Table 1 is the numerical value indicating "(Voltage drop at the 300th cycle)−(Voltage drop at the first cycle)". It means that as this value is smaller, the resistance increase is smaller and the secondary battery is more excellent.

Table 1 shows the compositions of the electrolyte solutions of the Examples and Comparative Examples and the evaluation results of the lithium ion secondary batteries. As for the composition of the electrolyte solution, the mass ratios of the compound(s) constituting the solvent and the compound(s) constituting the supporting salt based on the total mass of the electrolyte solution are also respectively described.

TABLE 1

| | Electrolyte solution composition | | | | | Characteristic evaluation after 300 cycles at 45° C. | | Mass ratio in electrolyte solution (wt. %) | | | | | |
|---|---|---|---|---|---|---|---|---|---|---|---|---|---|
| | Supporting salt composition (mol/L) | | | Non-aqueous solvent composition (volume ratio) | | capacity retention ratio (%) | Reduction in average discharge voltage during 1 C discharge (V) | cyclic carbonate | sulfone | fluor- inated ether | $LiPF_6$ | LiFSI | LiBOB |
| | $LiPF_6$ | LiFSI | LiBOB | | | | | | | | | | |
| Com. Ex. a1 | 0.4 | 0.6 | 0 | FEC/EMS/FE1 = 3/60/37 | | 50 | 0.8 | 3.1 | 45.5 | 39.4 | 4.2 | 7.8 | 0.0 |
| Ex. A1 | 0.35 | 0.6 | 0.05 | FEC/EMS/FE1 = 3/60/37 | | 67 | 0.6 | 3.1 | 45.4 | 39.3 | 3.7 | 7.8 | 0.7 |
| Ex. A2 | 0.2 | 0.6 | 0.2 | FEC/EMS/FE1 = 3/60/37 | | 64 | 0.64 | 3.1 | 45.2 | 39.1 | 2.1 | 7.8 | 2.7 |

Com. Ex. = Comparative Example
Ex. = Example

Example A showed that when the electrolyte solution contains the open-chain sulfone compound, the fluorinated ether compound, the cyclic carbonate compound, $LiPF_6$, LiFSI, and LiBOB, the capacity retention ratio of the secondary battery is improved and the reduction in the average discharge voltage during 1 C discharge can be suppressed.

Example B

Lithium ion secondary batteries were produced and evaluated in the same manner as in Example A, except that $Li(Li_{0.15}Ni_{0.25}Mn_{0.6})O_2$ was used as a positive electrode active material and the electrolyte solutions having the compositions described in Tables 2 and 3 were used.

TABLE 2

| | Electrolyte solution composition | | | | | Characteristic evaluation after 300 cycles at 45° C. | | Mass ratio in electrolyte solution (wt. %) | | | | | |
|---|---|---|---|---|---|---|---|---|---|---|---|---|---|
| | Supporting salt composition (mol/L) | | | Non-aqueous solvent composition (volume ratio) | | capacity retention ratio (%) | Reduction in average discharge voltage during 1 C discharge (V) | cyclic carbonate | sulfone | fluor- inated ether | $LiPF_6$ | LiFSI | LiBOB |
| | $LiPF_6$ | LiFSI | LiBOB | | | | | | | | | | |
| Com. Ex. b1 | 1 | 0 | 0 | EC/EiPS/DEC = 5/55/40 | | 66 | 0.5 | 5.5 | 49.6 | 0.0 | 12.6 | 0.0 | 0.0 |
| Com. Ex. b2 | 0.8 | 0 | 0.2 | EC/EiPS/DEC = 5/55/40 | | 66 | 0.42 | 5.4 | 49.2 | 0.0 | 10.0 | 0.0 | 3.2 |

TABLE 2-continued

| | Electrolyte solution composition | | | | Characteristic evaluation after 300 cycles at 45° C. | | Mass ratio in electrolyte solution (wt. %) | | | | | |
|---|---|---|---|---|---|---|---|---|---|---|---|---|
| | Supporting salt composition (mol/L) | | | Non-aqueous solvent composition (volume ratio) | capacity retention ratio (%) | Reduction in average discharge voltage during 1 C discharge (V) | cyclic carbonate | sulfone | fluor-inated ether | $LiPF_6$ | LiFSI | LiBOB |
| | $LiPF_6$ | LiFSI | LiBOB | | | | | | | | | |
| Com. Ex. b3 | 0.5 | 0.5 | 0 | EC/EiPS/DEC = 5/55/40 | 67 | 0.57 | 5.4 | 48.9 | 0.0 | 6.2 | 7.6 | 0.0 |
| Com. Ex. b4 | 0.4 | 0.4 | 0.2 | EC/EiPS/DEC = 5/55/40 | 52 | 0.36 | 5.4 | 48.7 | 0.0 | 4.9 | 6.1 | 3.1 |
| Com. Ex. b5 | 0 | 0.8 | 0.2 | EC/EiPS/DEC = 5/55/40 | 4 | 1.2 | 5.3 | 48.1 | 0.0 | 0.0 | 12.0 | 3.1 |
| Com. Ex. b6 | 0 | 1 | 0 | EC/EiPS/DEC = 5/55/40 | 3 | 1.2 | 4.5 | 40.9 | 41.8 | 0.0 | 12.8 | 0.0 |
| Com. Ex. b7 | 1 | 0 | 0 | EC/EiPS/FE1 = 5/55/40 | 71 | 0.29 | 4.6 | 41.9 | 42.8 | 10.6 | 0.0 | 0.0 |
| Com. Ex. b8 | 0.8 | 0 | 0.2 | EC/EiPS/FE1 = 5/55/40 | 70 | 0.26 | 4.6 | 41.7 | 42.6 | 8.5 | 0.0 | 2.7 |
| Com. Ex. b9 | 0.5 | 0.5 | 0 | EC/EiPS/FE1 = 5/55/40 | 71 | 0.26 | 4.6 | 41.4 | 42.3 | 5.2 | 6.5 | 0.0 |
| Ex. B1 | 0.45 | 0.45 | 0.1 | EC/EiPS/FE1 = 5/55/40 | 75 | 0.18 | 4.6 | 41.4 | 42.2 | 4.7 | 5.8 | 1.3 |
| Ex. B2 | 0.4 | 0.4 | 0.2 | EC/EiPS/FE1 = 5/55/40 | 76 | 0.13 | 4.5 | 41.3 | 42.2 | 4.2 | 5.2 | 2.7 |
| Com. Ex. b10 | 0 | 0.8 | 0.2 | EC/EiPS/FE1 = 5/55/40 | 4 | 1.2 | 4.5 | 40.9 | 41.7 | 0.0 | 10.2 | 2.6 |
| Ex. B3 | 0.1 | 0.85 | 0.05 | EC/EiPS/FE1 = 5/55/40 | 72 | 0.23 | 4.5 | 41.0 | 41.9 | 1.0 | 10.9 | 0.7 |
| Com. Ex. b11 | 0 | 0.9 | 0.1 | EC/EiPS/FE1 = 5/55/40 | 3 | 1.2 | 4.5 | 40.9 | 41.8 | 0.0 | 11.5 | 1.3 |
| Com. Ex. b12 | 0 | 1 | 0 | EC/EiPS/FE1 = 5/55/40 | 3 | 1.2 | 4.5 | 40.9 | 41.8 | 0.0 | 12.8 | 0.0 |

Com. Ex. = Comparative Example,
Ex. = Example

TABLE 3

| | Electrolyte solution composition | | | | Characteristic evaluation after 300 cycles at 45° C. | | Mass ratio in electrolyte solution (wt. %) | | | | | |
|---|---|---|---|---|---|---|---|---|---|---|---|---|
| | Supporting salt composition (mol/L) | | | Non-aqueous solvent composition (volume ratio) | capacity retention ratio (%) | Reduction in average discharge voltage during 1 C discharge [V] | cyclic carbonate | sulfone | fluor-inated ether | $LiPF_6$ | LiFSI | LiBOB |
| | $LiPF_6$ | LiFSI | LiBOB | | | | | | | | | |
| Com. Ex. b13 | 0.4 | 0.4 | 0.2 | EiPS/FE1 = 60/40 | 6 | 1.2 | 0.0 | 45.4 | 42.5 | 4.2 | 5.2 | 2.7 |
| Com. Ex. b14 | 0.5 | 0.5 | 0 | EC/PC/FE1 = 3/60/37 | 68 | 0.45 | 50.8 | 0.0 | 37.9 | 5.1 | 6.3 | 0.0 |
| Com. Ex. b15 | 0.45 | 0.45 | 0.1 | EC/PC/FE1 = 3/60/37 | 62 | 0.42 | 50.7 | 0.0 | 37.8 | 4.6 | 5.6 | 1.3 |
| Com. Ex. b16 | 1 | 0 | 0 | EC/DEC = 30/70 | 25 | 0.75 | 32.1 | 0.0 | 0.0 | 12.3 | 0.0 | 0.0 |
| Ex. B4 | 0.1 | 0.8 | 0.1 | FEC/EMS/FE1 = 3/60/37 | 77 | 0.24 | 3.1 | 45.1 | 39.1 | 1.0 | 10.3 | 1.3 |
| Ex. B5 | 0.8 | 0.1 | 0.1 | FEC/EMS/FE1 = 3/60/37 | 76 | 0.22 | 3.2 | 45.9 | 39.7 | 8.5 | 1.3 | 1.4 |
| Com. Ex. b17 | 0.5 | 0.5 | 0 | FEC/EMS/DES/FE1 = 3/40/20/37 | 71 | 0.27 | 3.0 | 47.6 | 38.0 | 5.1 | 6.3 | 0.0 |

TABLE 3-continued

| | Electrolyte solution composition | | | | Characteristic evaluation after 300 cycles at 45° C. | | Mass ratio in electrolyte solution (wt. %) | | | | | |
|---|---|---|---|---|---|---|---|---|---|---|---|---|
| | Supporting salt composition (mol/L) | | | Non-aqueous solvent composition | capacity retention ratio | Reduction in average discharge voltage during 1 C discharge | | | | | | |
| | $LiPF_6$ | LiFSI | LiBOB | (volume ratio) | (%) | [V] | cyclic carbonate | sulfone | fluorinated ether | $LiPF_6$ | LiFSI | LiBOB |
| Ex. B6 | 0.49 | 0.49 | 0.02 | FEC/EMS/DES/FE1 = 3/40/20/37 | 76 | 0.23 | 3.0 | 47.5 | 38.0 | 5.0 | 6.2 | 0.3 |
| Ex. B7 | 0.475 | 0.475 | 0.05 | FEC/EMS/DES/FE1 = 3/40/20/37 | 76 | 0.22 | 3.0 | 47.5 | 38.0 | 4.8 | 6.0 | 0.7 |
| Ex. B8 | 0.45 | 0.45 | 0.1 | FEC/EMS/MiPS/FE1 = 3/40/20/37 | 75 | 0.22 | 3.1 | 45.8 | 39.2 | 4.7 | 5.8 | 1.3 |
| Com. Ex. b18 | 0.5 | 0.5 | 0 | EC/SL/FE1 = 5/45/50 | 65 | 0.35 | 4.2 | 36.2 (SL) | 48.8 | 4.8 | 6.0 | 0.0 |
| Com. Ex. b19 | 0.45 | 0.45 | 0.1 | EC/SL/FE1 = 5/45/50 | 64 | 0.32 | 4.2 | 36.1 (SL) | 48.7 | 4.4 | 5.4 | 1.2 |
| Com. Ex. b20 | 0.4 | 0.4 | 0 | EC/DES/FE1 = 3/27/70 | 70 | 0.32 | 2.5 | 22.8 | 66.4 | 3.8 | 4.6 | 0.0 |
| Ex. B9 | 0.38 | 0.38 | 0.04 | EC/DES/FE1 = 3/27/70 | 73 | 0.24 | 2.5 | 22.7 | 66.3 | 3.6 | 4.4 | 0.5 |
| Com. Ex. b21 | 0.6 | 0.6 | 0 | FEC/EMS/FE2 = 3/70/27 | 69 | 0.29 | 3.2 | 53.6 | 29.0 | 6.4 | 7.9 | 0.0 |
| Ex. B10 | 0.58 | 0.58 | 0.04 | FEC/EMS/FE2 = 3/70/27 | 74 | 0.25 | 3.2 | 53.5 | 29.0 | 6.2 | 7.6 | 0.5 |

Com. Ex. = Comparative Example,
Ex. = Example

In Example B, it was shown that when the electrolyte solution contains the fluorinated ether compound, the open-chain sulfone compound, the cyclic carbonate compound, $LiPF_6$, LiFSI, and LiBOB, the capacity retention ratio is improved and the reduction in the average discharge voltage during 1 C discharge can be suppressed. Comparative Example b18 and Comparative Example b19 respectively contain sulfolane, which is a cyclic sulfone compound, instead of the open-chain sulfone compound. Compared with these Comparative Examples, the Examples using the electrolyte solution containing the open-chain sulfone compound according to the present invention showed remarkably high capacity retention ratios.

Example C

Lithium ion secondary batteries were produced and evaluated in the same manner as in Example A, except that the positive electrode active material, the negative electrode, and the electrolyte solution were changed as follows. $Li(Li_{0.15}Ni_{0.25}Mn_{0.6})O_2$ was used as a positive electrode active material. A mixture of SiO and graphite (weight ratio of SiO:graphite=80:20) was used as a negative electrode active material and polyacrylic acid (PAA) was used as a negative electrode binder, to produce a negative electrode so that the negative electrode active material:the electrically conductive agent:the negative electrode binder=93:2:5 (weight ratio) was satisfied. The compositions of the electrolyte solutions were as shown in Table 4. The results are shown in Table 4.

Example D

Lithium ion secondary batteries were produced and evaluated in the same manner as in Example A except that the positive electrode active material, the negative electrode and the electrolyte solution were changed as follows. $Li(Li_{0.15}Ni_{0.25}Mn_{0.6})O_2$ was used as a positive electrode active material. A mixture of Si alloy (alloy of Si and Ni, weight ratio thereof is Si:Ni=98:2) and graphite (weight ratio is Si alloy:graphite=50:50) was used as a negative electrode active material, and the same polyacrylic acid as in Example C was used as a negative electrode binder, to produce a negative electrode so that the negative electrode active material:the electrically conductive agent:the negative electrode binder=73:2:25 (weight ratio) was satisfied. The compositions of the electrolyte solutions were as shown in Table 4. The evaluation results of each secondary battery are shown in Table 4.

Example E

Lithium ion secondary batteries were produced and evaluated in the same manner as in Example A except that $Li(Ni_{0.8}Co_{0.15}Al_{0.05})O_2$ was used as a positive electrode active material and the electrolyte solutions having the compositions as described in Table 4 were used. The upper limit voltage in the evaluation of the secondary battery was 4.2V. The results are shown in Table 4.

TABLE 4

| | Electrolyte solution composition | | | | Characteristic evaluation after 300 cycles at 45° C. | | Mass ratio in electrolyte solution (wt. %) | | | | | |
|---|---|---|---|---|---|---|---|---|---|---|---|---|
| | Supporting salt composition (mol/L) | | | Non-aqueous solvent composition | capacity retention ratio | Reduction in average discharge voltage during 1 C discharge | cyclic carbonate | sulfone | fluor- inated ether | LiPF$_6$ | LiFSI | LiBOB |
| | LiPF$_6$ | LiFSI | LiBOB | (volume ratio) | (%) | (V) | | | | | | |
| Com. Ex. c1 | 0.5 | 0.5 | 0 | FEC/EMS/FE1 = 3/47/50 | 68 | 0.4 | 3.0 | 34.3 | 51.3 | 5.1 | 6.3 | 0.0 |
| Ex. C1 | 0.48 | 0.48 | 0.04 | FEC/EMS/FE1 = 3/47/50 | 75 | 0.32 | 3.0 | 34.3 | 51.3 | 4.9 | 6.0 | 0.5 |
| Com. Ex. d1 | 0.5 | 0.5 | 0 | FEC/EMS/FE1 = 3/47/50 | 58 | 0.3 | 3.0 | 34.3 | 51.3 | 5.1 | 6.3 | 0.0 |
| Ex. D1 | 0.48 | 0.48 | 0.04 | FEC/EMS/FE1 = 3/47/50 | 63 | 0.25 | 3.0 | 34.3 | 51.3 | 4.9 | 6.0 | 0.5 |
| Com. Ex. e1 | 0.5 | 0.5 | 0 | FEC/EMS/FE1 = 5/45/50 | 78 | 0.09 | 5.0 | 32.7 | 51.0 | 5.1 | 6.2 | 0.0 |
| Ex. E1 | 0.48 | 0.48 | 0.04 | FEC/EMS/FE1 = 5/45/50 | 82 | 0.08 | 5.0 | 32.7 | 51.0 | 4.9 | 6.0 | 0.5 |

Com. Ex. = Comparative Example,
Ex. = Example

In Examples C to E as described above, it was also shown that when the electrolyte solution contains the fluorinated ether compound, the open-chain sulfone compound, the cyclic carbonate compound, LiPF$_6$, LiFSI, and LiBOB, an increase in resistance due to charge and discharge can be suppressed and the capacity retention ratio can be improved.

The whole or part of the example embodiments disclosed above can be described as, but not limited to, the following supplementary notes.

(Supplementary Note 1)

A lithium ion secondary battery comprising:

a negative electrode active material comprising a material comprising silicon as a constituent element; and an electrolyte solution comprising:

a non-aqueous solvent comprising a fluorinated ether compound represented by the following formula (1), an open-chain sulfone compound represented by the following formula (2), and a cyclic carbonate compound, and a supporting salt comprising LiPF$_6$, lithium bis(fluorosulfonyl)imide (LiFSI), and lithium bis(oxalato)borate (LiBOB); wherein the content of LiBOB in the electrolyte solution is 0.2 mass % or more;

$$R_1\text{—O—}R_2 \quad (1)$$

in formula (1), R$_1$ and R$_2$ each independently represent an alkyl group or a fluorinated alkyl group, and at least one of R$_1$ and R$_2$ represents a fluorinated alkyl group;

(2)

in formula (2), R$_1$ and R$_2$ each independently represent a substituted or unsubstituted alkyl group.

(Supplementary Note 2)

The lithium ion secondary battery according to the supplementary note 1, wherein the content of LiBOB in the electrolyte solution is 0.3 mass % or more and 20 mass % or less.

(Supplementary Note 3)

The lithium ion secondary battery according to the supplementary note 1 or 2, wherein the molar ratio of LiBOB, LiPF$_6$, and LiFSI in the electrolyte solution is within a range surrounded by four points of (0.02:0.93:0.05), (0.3:0.65:0.05), (0.02:0.1:0.88), and (0.3:0.1:0.6) in a three-phase diagram of LiBOB:LiPF$_6$:LiFSI.

(Supplementary Note 4)

The lithium ion secondary battery according to any one of supplementary notes 1 to 3, wherein the content of the open-chain sulfone compound in the electrolyte solution is 20 mass % or more and 80 mass % or less.

(Supplementary Note 5)

The lithium ion secondary battery according to any one of the supplementary notes 1 to 4, wherein the content of the fluorinated ether compound in the electrolyte solution is 10 mass % or more and 80 mass % or less.

(Supplementary Note 6)

The lithium ion secondary battery according to any one of the supplementary notes 1 to 5, wherein the content of the cyclic carbonate compound in the electrolyte solution is 1 mass % or more and 30 mass % or less.

(Supplementary Note 7)

The lithium ion secondary battery according to any one of the supplementary notes 1 to 6, wherein the volume ratio of the cyclic carbonate compound, the open-chain sulfone compound, and the fluorinated ether compound in the electrolyte solution is within a range surrounded by four points of (0.01:0.89:0.1), (0.35:0.55:0.1), (0.35:0.2:0.45) and (0.01:0.2:0.79) in a three-phase diagram of the cyclic carbonate compound: the open-chain sulfone compound: the fluorinated ether compound.

(Supplementary Note 8)

The lithium ion secondary battery according to any one of the supplementary notes 1 to 7, wherein the material comprising silicon as a constituent element is a silicon oxide and/or a silicon alloy.

(Supplementary Note 9)

The lithium ion secondary battery according to any one of the supplementary notes 1 to 8, further comprising a positive electrode comprising at least one positive electrode active material selected from the group consisting of the compounds represented by the following formulae (A1), (A2) and (B):

$$Li(Li_xM_{1-x-z}Mn_z)O_2 \quad (A1)$$

in formula (A1), $0.1 \leq x < 0.3$, $0.4 \leq z < 0.8$, M is at least one element selected from the group consisting of Ni, Co, Fe, Ti, Al and Mg;

$$Li_yNi_{(1-x)}M_xO_2 \quad (A2)$$

in formula (A2), $0 \leq x < 1$, $0 < y \leq 1$, and M is at least one element selected from the group consisting of Li, Co, Al, Mn, Fe, Ti, and B;

$$Li_a(M_xMn_{2-x-y}Y_y)(O_{4-w}Z_w) \quad (B)$$

in formula (B), $0.4 < x < 1.2$, $0 < y$, $x+y < 2$, $0 < a < 1.2$, and $0 < w < 1$; M is a transition metal element and comprises at least one element selected from the group consisting of Co, Ni, Fe, Cr and Cu; Y is a metal element and comprises at least one element selected from the group consisting of Li, B, Na, Al, Mg, Ti, Si, K and Ca; and Z is at least one element selected from the group consisting of F and Cl.

(Supplementary Note 10)

The lithium ion secondary battery according to any one of the supplementary notes 1 to 9, wherein the open-chain sulfone compound comprises at least one compound selected from the group consisting of ethyl methyl sulfone, methyl isopropyl sulfone, ethyl isopropyl sulfone, diethyl sulfone and dimethyl sulfone.

(Supplementary Note 11)

The lithium ion secondary battery according to any one of the supplementary notes 1 to 10, wherein the fluorinated ether compound comprises at least one compound selected from the group consisting of 1,1,2,2-tetrafluoroethyl 2,2,3,3-tetrafluoropropyl ether, 1H, 1H, 2'H, 3H-decafluorodipropyl ether, bis(2,2,3,3,3-pentafluoropropyl) ether, 1H, 1H, 2'H-perfluorodipropyl ether, bis(2,2,3,3-tetrafluoropropyl) ether, and ethyl 1,1,2,3,3,3-hexafluoropropyl ether.

(Supplementary Note 12)

The lithium ion secondary battery according to any one of the supplementary notes 1 to 11, wherein the cyclic carbonate compound comprises at least one compound selected from the group consisting of ethylene carbonate, propylene carbonate, and 4-fluoro-1,3-dioxolan-2-one.

(Supplementary Note 13)

A method of producing a lithium ion secondary battery comprising:

stacking a positive electrode and a negative electrode via a separator to produce an electrode element, and enclosing the electrode element and an electrolyte solution in an outer package, wherein the negative electrode comprises a negative electrode active material comprising a material comprising silicon as a constituent element, and the electrolyte solution comprises:

a non-aqueous solvent comprising a fluorinated ether compound represented by the following formula (1), an open-chain sulfone compound represented by the following formula (2), and a cyclic carbonate compound, and a supporting salt comprising $LiPF_6$, lithium bis(fluorosulfonyl)imide (LiFSI), and lithium bis(oxalato)borate (LiBOB) and wherein the content of LiBOB in the electrolyte solution is 0.2 mass % or more;

$$R_1-O-R_2 \quad (1)$$

in formula (1), $R_1$ and $R_2$ each independently represent an alkyl group or a fluorinated alkyl group, and at least one of $R_1$ and $R_2$ represents a fluorinated alkyl group;

in formula (2), $R_1$ and $R_2$ each independently represent a substituted or unsubstituted alkyl group.

(Supplementary Note 14)

A vehicle equipped with the lithium ion secondary battery according to any one of the supplementary notes 1 to 12.

(Supplementary Note 15)

An assembled battery comprising the lithium ion secondary battery according to any one of the supplementary notes 1 to 12.

While the invention has been particularly shown and described with reference to example embodiments (and examples) thereof, the invention is not limited to these embodiments (and examples). It will be understood by those of ordinary skill in the art that various changes in form and details may be made therein without departing from the spirit and scope of the present invention as defined by the claims.

INDUSTRIAL APPLICABILITY

The lithium ion secondary battery of the present invention can be utilized in various industrial fields that require for an electric power source and in an industrial field concerning transportation, storage and supply of electric energy. Specifically, it can be utilized for, for example, an electric power source of a mobile device such as a mobile phone and a notebook computer; an electric power source of a moving or transport medium including an electric vehicle such as an electric car, a hybrid car, an electric motorcycle and an electric power-assisted bicycle, a train, a satellite and a submarine; a back-up electric power source such as UPS; and an electric power storage device for storing an electric power generated by solar power generation, wind power generation, and the like.

EXPLANATION OF REFERENCE

1 positive electrode active material layer
2 negative electrode active material layer
3 positive electrode current collector
4 negative electrode current collector
5 separator
6 exterior laminate
7 negative electrode lead terminal
8 positive electrode lead terminal
10 film outer package
20 battery element 25 separator
30 positive electrode
40 negative electrode

The invention claimed is:

1. A lithium ion secondary battery comprising:
(a) a negative electrode active material comprising a material comprising silicon as a constituent element; and
(b) an electrolyte solution comprising:
(b1) a non-aqueous solvent comprising a fluorinated ether compound represented by the following formula (1), an open-chain sulfone compound represented by the following formula (2), and a cyclic carbonate compound, and
(b2) a supporting salt comprising LiPF$_6$, lithium bis(fluorosulfonyl)imide (LiFSI), and lithium bis(oxalato)borate (LiBOB); wherein
the content of LiBOB in the electrolyte solution is 0.2 mass % or more;

$$R_1-O-R_2 \qquad (1)$$

in formula (1), $R_1$ and $R_2$ each independently represent an alkyl group or a fluorinated alkyl group, and at least one of $R_1$ and $R_2$ represents a fluorinated alkyl group;

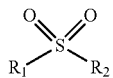
(2)

in formula (2), $R_1$ and $R_2$ each independently represent a substituted or unsubstituted alkyl group.

2. The lithium ion secondary battery according to claim 1, wherein the content of LiBOB in the electrolyte solution is 0.3 mass % or more and 20 mass % or less.

3. The lithium ion secondary battery according to claim 1, wherein the molar ratio of LiBOB, LiPF$_6$, and LiFSI in the electrolyte solution is within a range surrounded by four points of (0.02:0.93:0.05), (0.3:0.65:0.05), (0.02:0.1:0.88), and (0.3:0.1:0.6) in a three-phase diagram of LiBOB: LiPF$_6$: LiFSI.

4. The lithium ion secondary battery according to claim 1, wherein the content of the open-chain sulfone compound in the electrolyte solution is 20 mass % or more and 80 mass % or less.

5. The lithium ion secondary battery according to claim 1, wherein the content of the fluorinated ether compound in the electrolyte solution is 10 mass % or more and 80 mass % or less.

6. The lithium ion secondary battery according to claim 1, wherein the content of the cyclic carbonate compound in the electrolyte solution is 1 mass % or more and 30 mass % or less.

7. The lithium ion secondary battery according to claim 1, wherein the volume ratio of the cyclic carbonate compound, the open-chain sulfone compound, and the fluorinated ether compound in the electrolyte solution is within a range surrounded by four points of (0.01:0.89:0.1), (0.35:0.55:0.1), (0.35:0.2:0.45) and (0.01:0.2:0.79) in a three-phase diagram of the cyclic carbonate compound: the open-chain sulfone compound: the fluorinated ether compound.

8. The lithium ion secondary battery according to claim 1 wherein the material comprising silicon as a constituent element is a silicon oxide and/or a silicon alloy.

9. The lithium ion secondary battery according to claim 1 further comprising a positive electrode comprising at least one positive electrode active material selected from the group consisting of the compounds represented by the following formulae (A1), (A2) and (B):

$$Li(Li_xM_{1-x-z}Mn_z)O_2 \qquad (A1)$$

in formula (A1), $0.1 \leq x < 0.3$, $0.4 \leq z \leq 0.8$, M is at least one element selected from the group consisting of Ni, Co, Fe, Ti, Al and Mg;

$$Li_yNi_{(1-x)}M_xO_2 \qquad (A2)$$

in formula (A2), $0 \leq x < 1$, $0 < y \leq 1$, and M is at least one element selected from the group consisting of Li, Co, Al, Mn, Fe, Ti, and B;

$$Li_a(M_xMn_{2-x-y}Y_y)(O_{4-w}Z_w) \qquad (B)$$

in formula (B), $0.4 \leq x \leq 1.2$, $0 \leq y$, $x+y<2$, $0 \leq a \leq 1.2$, and $0 \leq w \leq 1$; M is a transition metal element and comprises at least one element selected from the group consisting of Co, Ni, Fe, Cr and Cu; Y is a metal element and comprises at least one element selected from the group consisting of Li, B, Na, Al, Mg, Ti, Si, K and Ca; and Z is at least one element selected from the group consisting of F and Cl.

10. The lithium ion secondary battery according to claim 1, wherein the open-chain sulfone compound comprises at least one compound selected from the group consisting of ethyl methyl sulfone, methyl isopropyl sulfone, ethyl isopropyl sulfone, diethyl sulfone and dimethyl sulfone.

11. The lithium ion secondary battery according to claim 1, wherein the fluorinated ether compound comprises at least one compound selected from the group consisting of 1,1,2,2-tetrafluoroethyl 2,2,3,3-tetrafluoropropyl ether, 1H, 1H, 2'H, 3H-decafluorodipropyl ether, bis(2,2,3,3,3-pentafluoropropyl) ether, 1H, 1H, 2'H-perfluorodipropyl ether, bis(2,2,3,3-tetrafluoropropyl) ether, and ethyl 1,1,2,3,3,3-hexafluoropropyl ether.

12. The lithium ion secondary battery according to claim 1, wherein the cyclic carbonate compound comprises at least one compound selected from the group consisting of ethylene carbonate, propylene carbonate, and 4-fluoro-1,3-dioxolan-2-one.

13. A method of producing a lithium ion secondary battery comprising:
stacking a positive electrode and a negative electrode via a separator to produce an electrode element, and
enclosing the electrode element and an electrolyte solution in an outer package, wherein
(a) the negative electrode comprises a negative electrode active material comprising a material comprising silicon as a constituent element, and
(b) the electrolyte solution comprises:
(b1) a non-aqueous solvent comprising a fluorinated ether compound represented by the following formula (1), an open-chain sulfone compound represented by the following formula (2), and a cyclic carbonate compound, and
(b2) a supporting salt comprising LiPF$_6$, lithium bis(fluorosulfonyl)imide (LiFSI), and lithium bis(oxalato)borate (LiBOB) and wherein the the content of LiBOB in the electrolyte solution is 0.2 mass % or more;

$$R_1-O-R_2 \qquad (1)$$

in formula (1), $R_1$ and $R_2$ each independently represent an alkyl group or a fluorinated alkyl group, and at least one of $R_1$ and $R_2$ represents a fluorinated alkyl group;

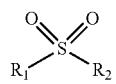
(2)
in formula (2), $R_1$ and $R_2$ each independently represent a substituted or unsubstituted alkyl group.
14. A vehicle equipped with the lithium ion secondary battery according to claim 1.
* * * * *